United States Patent [19]
Epstein et al.

[11] Patent Number: 5,956,183
[45] Date of Patent: Sep. 21, 1999

[54] FIELD-CUSTOMIZABLE VARIABLE FOCAL LENGTH LENS

[76] Inventors: Saul Epstein, 14558 Deervale Pl.; Stephen Kurtin, 3835 Kingswood Rd., both of Sherman Oaks, Calif. 91403

[21] Appl. No.: 09/084,473

[22] Filed: May 26, 1998

[51] Int. Cl.⁶ ........................................ G02B 1/06
[52] U.S. Cl. ...................... 359/666; 359/365; 359/832
[58] Field of Search .............. 351/41, 158, 159, 351/161, 168, 169; 359/666, 665, 832, 642, 508–588, 601–614, 886, 722, 831

[56] References Cited

U.S. PATENT DOCUMENTS

| | | |
|---|---|---|
| 60,109 | 11/1866 | Woodward . |
| 504,890 | 9/1893 | Ohmart . |
| 509,379 | 9/1893 | Ingram . |
| 1,269,422 | 6/1918 | Gordon . |
| 1,515,389 | 11/1924 | Hopkins . |
| 2,576,581 | 11/1951 | Edwards ............................ 88/41 |
| 3,161,718 | 12/1964 | De Luca ............................ 88/57 |
| 3,598,479 | 8/1971 | Wright ............................ 351/159 |
| 4,181,408 | 1/1980 | Senders ............................ 351/159 |
| 4,261,655 | 4/1981 | Honigsbaum ....................... 351/41 |
| 4,913,536 | 4/1990 | Barnea ............................ 350/419 |
| 5,124,734 | 6/1992 | Barnea ............................ 351/169 |
| 5,138,494 | 8/1992 | Kurtin ............................ 359/666 |
| 5,182,585 | 1/1993 | Stoner ............................ 351/41 |
| 5,371,629 | 12/1994 | Kurtin et al. ....................... 359/666 |
| 5,436,766 | 7/1995 | Leary ............................ 359/665 |
| 5,526,067 | 6/1996 | Cronin ............................ 351/94 |
| 5,668,620 | 9/1997 | Kurtin et al. ....................... 351/158 |

FOREIGN PATENT DOCUMENTS

258325  9/1926  United Kingdom .

*Primary Examiner*—Hung Xuan Dang

[57] ABSTRACT

A liquid-filled variable focus lens unit, particularly useful in eyeglasses, comprised of a generic variable focus capsule to which a fixed-focus rigid lens is attached. The capsule has a preestablished optical power at its distance setting, which may be the same for all capsules of a given style, and a variable optical addition. The rigid lens, which is attached to a completed capsule, includes a surface having a shape related to the visual acuity of an intended user so that the combination of a generic capsule and the rigid lens results in a lens unit having a net optical power which matches the refractive prescription of the intended user at all distances.

14 Claims, 1 Drawing Sheet

FIELD-CUSTOMIZABLE VARIABLE FOCAL LENGTH LENS

BACKGROUND OF THE INVENTION

This invention relates to liquid-filled variable focal length lenses, particularly those used in eyeglasses. Such lenses have been disclosed in a number of prior patents, e.g., U.S. Pat. No. 3,598,479 (Wright 1971), U.S. Pat. No. 5,138,494 (Kurtin 1992) and U.S. Pat. No. 5,668,620 (Kurtin et al. 1997). In particular, this invention is directed to a construction which includes two conceptually distinct parts: 1) a variable focus capsule (which is amenable to volume production since all capsules of a given style can be identical), and 2) a fixed-focus rigid lens, which is attached to the variable focus capsule. The combination results in a lens unit which has the optical power to match a particular person's requirements for all viewing distances—from far to near. The lens units disclosed herein are particularly useful as components of eyeglasses, but it will be appreciated that other applications also exist.

The need for variable focus eyeglasses arises as people age because, generally beginning at about age forty five, the lens in the human eye becomes incapable of sufficient accommodation to focus on near objects. After the onset of this condition of limited focal accommodation, called presbyopia, a single set of fixed focus spectacles will be found to be unsatisfactory for both distant and near vision, irrespective of the wearer's general visual acuity. Whatever correction (if any) may be required to correct a person's vision for distance, an additional amount of optical power (up to about three diopters) will be found to be required to correct that person's eyesight for near vision. The required "near addition" generally does not involve an astigmatic component.

One solution to this problem is to fit presbyopes with spectacles having bifocal (or trifocal) lenses. In the most common form of bifocal lens, the upper part is ground to provide the wearer with the proper correction (if any is needed) for distance vision, and the lower part is ground with the same correction plus an additional amount of optical power to bring near objects into focus. This "near addition" amounts to at most about three diopters of additional optical power. Using bifocal lenses in a pair of spectacles allows a person to see distant objects clearly by looking straight ahead, and to see close objects clearly by looking downward.

Rather than an abrupt change in focal length between the upper and the lower parts of the lens, as in the bi- (or tri-) focal lens, other lens forms have been developed wherein the focal length gradually changes as the eye moves to look through different parts of the lens. These lenses are called "progressive addition lenses." However, progressive lenses inherently suffer from having a limited undistorted field of view. For this and other reasons, only a relatively small fraction of the potential market for multifocal eyeglasses is being met by progressives.

An important difficulty associated with all prior art fixed multifocal spectacles (e.g., bifocals, trifocals and progressives) arises because various parts of the lenses used have different focal lengths. Hence in order to focus on a particular object one must look through the portion of the lens which has the proper focal length for the distance of that object, and this is not always convenient. For example, if one wishes to read the title of a book on an upper shelf, one will find himself looking through the portion of a multifocal lens intended to view distant objects, and the book title will not be in focus.

A liquid-filled variable focus lens avoids this and other problems associated with lenses which provide multiple fixed foci. This is accomplished by providing a lens unit with continuously variable focus, wherein the focal length is substantially constant over the full field of the lens at each setting. The required "near addition" is provided by changing the shape of the lens as needed.

Liquid-filled variable focus lens units for spectacles as described in the prior art (e.g., the aforementioned U.S. patents) involve: 1) a fixed-focus rigid lens, one side of which is shaped to provide the wearer's distance correction, 2) a layer of liquid against the other side of the rigid lens, and 3) a distensible or deformable membrane bounding the side of the liquid away from the rigid lens. If either the volume of liquid between the rigid lens and the membrane is increased (e.g., Wright '479), or the spacing between the rigid lens and the membrane is reduced (e.g., Kurtin '494 and Kurtin et al. '620), the liquid pressure will increase and the membrane will bulge outward so as to increase the optical power of the lens unit. The opposite action will result in membrane relaxation and a decrease in optical power.

Since each potential wearer of eyeglasses requires his or her own prescription, the rigid lens must be ground with a specific wearer in mind. According to the designs of the prior art, the rigid lens forms one boundary of the liquid portion of the lens, and must be incorporated at a very early step in the assembly process. This creates a problem during production in that after the rigid lens is installed, there must be careful tracking of the units throughout the remainder of the manufacturing process to assure that the individual units are identified and not mixed up. Scheduling of production lots may also prove difficult. Hence, with prior art designs, the economies which flow from assembling large quantities of identical products may be difficult to achieve.

It is therefore an object of the present invention to facilitate production of variable focus lens units for eyeglasses (and other applications) by providing a construction which includes a self contained, liquid-filled, variable focus capsule and a separable fixed-focus rigid lens. The variable focus capsule may be fabricated and assembled without reference to the visual acuity of the potential wearer of the eyeglasses, and hence is more amenable to mass production methods.

SUMMARY OF THE INVENTION

As noted above, in prior art liquid-filled variable focus spectacle lenses, the rigid lens (which includes a correction related to the distance visual acuity of the intended wearer) forms one wall of the enclosure containing the liquid volume. Consequently, the rigid lens must be assembled to the unit at an early stage, and certainly before the unit is filled with liquid. In the present unit, the element which has an optical power dependent on the intended wearer (called a lens wafer herein) is not in contact with the liquid, and hence can be the last item installed. This arrangement permits variable focus spectacles to be completely assembled by mass production methods, and only individualized for a particular wearer as the last step, for example at the point of sale.

In practicing the present invention, a variable focus "capsule" is first fabricated. This capsule is generally similar to a prior art liquid-filled variable focus lens, except that the custom rigid lens used in the prior art is omitted, and in its place, for purposes of retaining the liquid in the capsule, is a transparent wall member called a "lens interface". The lens interface retains the liquid, but as will be explained below, it does not affect the optical properties of the completed lens unit. In other words, a liquid-filled variable focus capsule, as that term is used herein, includes 1) a transparent wall member, 2) a layer of transparent liquid, and 3) a distensible membrane, in face to face relationship. Also, included is a provision to vary the pressure of the liquid to cause the distensible membrane to distend. The capsule does have, of course, certain optical characteristics, but those characteristics need not match the optical requirements of an intended user. They are generic in the sense that a single design of capsule can be used to satisfy the needs of many users with widely varying eyeglass prescriptions. The lens interface, rather than being a custom part depending on the intended wearer (i.e., the rigid lens used in prior art designs), may be identical in all capsules of the same style.

In order to match the optical requirements of an intended user, as a last step in the manufacturing procedure—possibly at the point of sale—a custom lens wafer is installed on the completed capsule, abutting the lens interface. The custom lens wafer has an appropriate surface (opposite the lens interface) to create a lens unit which, in its distance position, has an optical power appropriate to match the intended wearer's distance prescription. The capsule provides a continuously variable range of optical powers so that the combination of capsule and rigid lens will permit the intended user to focus on any object from infinity to reading distance.

Two embodiments of the invention are described in detail below. In one of the embodiments, the lens interface is comprised of a thin membrane (called an interface membrane). The interface membrane is bonded to a supporting structure called a wafer support (since it also supports the later-to-be-installed lens wafer). The second embodiment has a lens interface which is molded integral with the wafer support. In both cases, an identical lens interface can be used for all lenses of the same style, irrespective of the visual acuity of the eventual user. An individualized lens wafer is later placed in contact with the lens interface and secured in place, creating a composite unit having the needed optical characteristics to result in a variable focus lens suitable for the intended wearer.

DETAILED DESCRIPTION OF THE INVENTION

Figure 1:
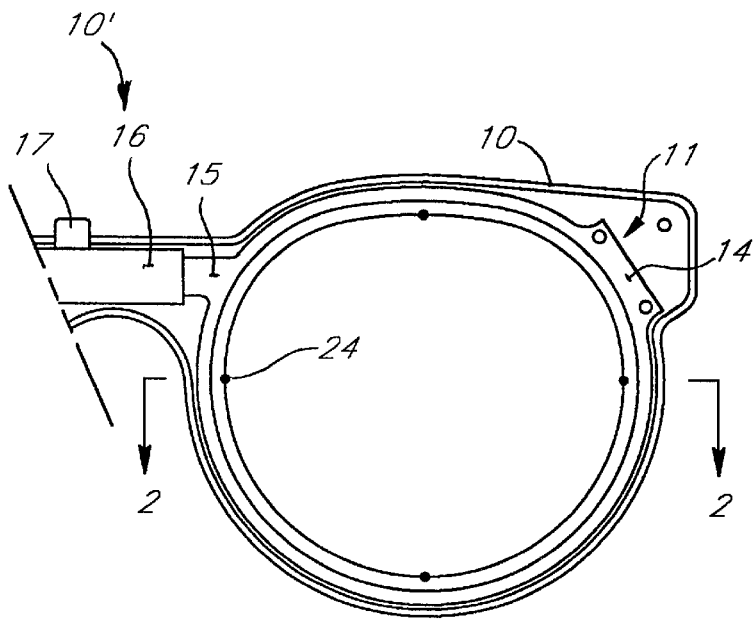
FIG. 1 is a rear view (i.e., from the wearer's side) of a portion of a pair of spectacles using lens units according to a first embodiment of the present invention.

FIG. 1 depicts a portion of a pair of spectacles which include variable focus lens units according to the present invention. Only the right lens unit is shown, the left lens unit being essentially a mirror image of the right unit. For illustrative purposes, the invention will be described in the context of a lens of the type disclosed in the '494 and '620 patents, but it will be appreciated that the principles are also applicable to lenses such as disclosed in the '479 patent, as well as to other constructions.

Basically, a variable focus lens of the type being described can be thought of as a fixed-focus rigid lens plus a liquid lens which has a variable power. The liquid lens is bounded on one side by the rigid lens, and on the other side by a distensible transparent membrane, the space between the membrane and the rigid lens being filled with a transparent liquid. If the rigid lens is moved closer to the membrane, the membrane will distend, becoming convex and increasing the optical power of the lens unit. Conversely, if the lens is moved away from the membrane, the membrane will become concave (or less convex), reducing the optical power of the unit.

As seen in FIG. 1, the spectacles depicted include a frame 10 to which temples (not shown) are attached. The frame is generally symmetrical about a nasal region 10' and a pair of lens units are attached by screws or other means (not shown) on either side of the nasal region 10'. Slightly more than one half of a pair of spectacles is illustrated in FIG. 1, only the right hand lens unit (11) being shown.

Figure 2:
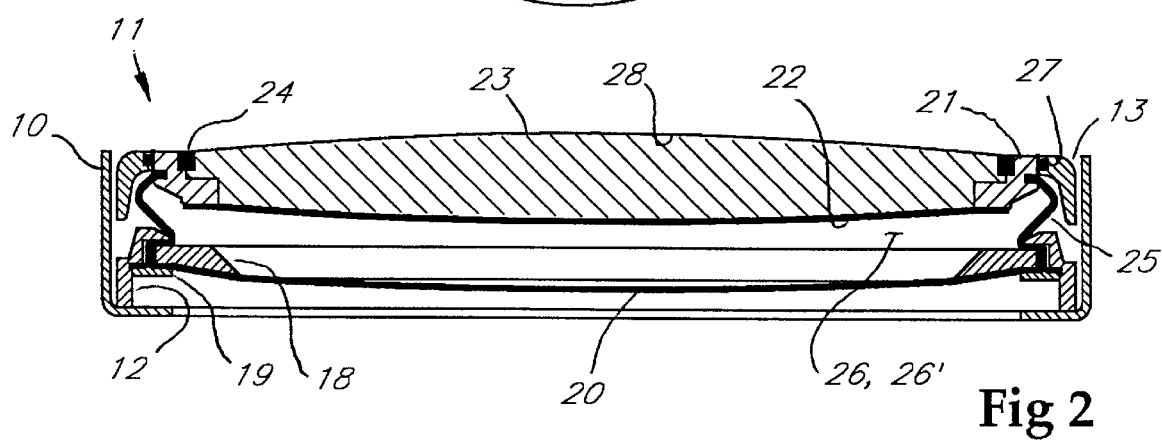
FIG. 2 is a cross sectional view of the right eye lens unit from the spectacles shown in FIG. 1, taken at 2—2 of FIG. 1.

A cross sectional view of a first embodiment of a lens unit according to the present invention is shown in FIG. 2. The supporting structure of the lens unit is comprised of front ring 12 and rear ring 13; front ring 12 being firmly attached to frame 10, and rear ring 13 being hingedly attached to front ring 12 at ear 14 (which can be seen in FIG. 1). The hinges can be of any of various types, torsional flexures being presently preferred. A tab 15 on rear ring 13, remote from the hinges, is coupled to an actuator 16. Moving slider 17 of actuator 16 causes the tab 15 to move toward and away from the front ring 13.

The front ring assembly as shown includes a circularizing membrane support 18 (such as described in the '620 patent mentioned above), a retainer 19, and a transparent distensible membrane 20. The membrane 20 (under tension) is bonded to the retainer, which, in turn, is attached to the front ring 12, preferably by laser welding.

The rear ring assembly includes the ring 13 itself, a wafer support 21, a interface membrane 22, and a lens wafer 23. The wafer support 21 is secured to the ring 13 by either mechanical or adhesive means. One possible method of joining support member 21 to ring 13 is to use an epoxy adhesive. Since this joint may be subject to large stresses as the ambient temperature varies, it is preferred that a circumferential groove 27 be cut in ring 13 at its joint with support member 21 to provide a mechanical restraint against axial movement if the epoxy joint debonds from the rear ring. Interface membrane 22 is attached to the face of wafer support 21, preferably by adhesive means, with the membrane under tension.

The surface of lens wafer 23 which abuts interface membrane 22 is preferably slightly convex, for example having a spherical radius of about 40 inches, so that when assembled, the wafer will press against the membrane and expel any trapped air. Optionally, a small quantity of liquid between the surfaces when assembling the wafer to the lens unit will help in expelling air. Ideally, this liquid should have substantially the same index of refraction as the wafer so as to avoid internal reflections. As will be explained below, the shape of the interior surface of lens wafer 23 does not affect the optical properties of the lens unit and has significance only insofar as it facilitates proper assembly. Lens wafer 23 is held to wafer support 21 and against interface membrane 22 by a plurality of adhesive plugs 24. Other methods of attaching the lens wafer to the wafer support are of course possible.

The front and rear ring assemblies are connected by a circumferential elastomer seal 25, forming a closed volume 26 which is filled with a transparent liquid (denoted herein by numeral 26'). Preferably the lens wafer 23, the wafer support member 21, the interface membrane 22, the filling liquid 26', the membrane support 18, and the distensible membrane 20 are all transparent, and preferably have substantially the same index of refraction. Notwithstanding the previous sentence, it is not essential that the wafer support 21 and membrane support 18 be transparent, but it is preferred that they are. The reason for preferring index matching is that if all elements in the line of sight of the wearer have the same index of refraction, there will be no bothersome internal reflections, and also, the interfaces between the various elements will be substantially invisible to other persons. Adequate index matching can be achieved by fabricating the solid parts from polycarbonate, the membranes from saran, and using an appropriate high index silicone oil as the liquid filling. Since silicone oil attacks most rubbers, the seal 25 is preferably molded from a fluorosilicone elastomer, which is not so attacked.

Light which travels through regions of constant refractive index travels in a straight line (even though the region is made up of several physically distinct parts, as in the lens unit described above). Hence, with index matched parts, irrespective of the shapes of the individual internal parts, there can be no distortion or optical power generated within the lens unit. The optical power of the lens unit is therefore a function only of 1) the difference in index between the lens unit elements and the surrounding medium (air), and 2) the shapes of the external surfaces of the lens unit.

For cosmetic reasons, it is preferred that the curvature of the surface of distensible membrane 20 be positive and sufficient to present a pleasing appearance. A minimum curvature corresponding to an optical power of about +0.5 diopters has been found to be cosmetically satisfactory. The minimum curvature occurs when the lens unit is set for distance viewing.

If the wearer requires no correction for distance viewing, the external surface 28 of lens wafer 23 is ground to a compensating optical power of −0.5 diopters, so that the net optical power of the lens unit (when set for distance viewing) is zero. If the wearer requires a correction for distance viewing, that correction, including both spherical and astigmatic components (minus 0.5 diopters of sphere), is ground into the surface 28.

Moving slider 17 from the distance position toward the reading position causes actuator 16 to move tab 15, which in turn causes the rear ring assembly to tilt toward the front ring assembly. Since the liquid filling is sensibly incompressible, this motion causes distensible membrane 20 to bulge, increasing the optical power of its surface and adding a spherical reading addition to the lens unit.

Functionally, the lens unit described is identical with the units disclosed in the '494 and '620 patents referred to above. The difference is in the construction of the present invention, which permits the assembly sequence to be such that the proposed wearer's correction can be incorporated in the assembly at a very late stage of the production cycle, rather than as one of the first steps. It will be appreciated that this flexibility in fabrication sequence is of tremendous usefulness, since it permits volume production of identical capsules, with the fitting to the proposed wearer (by adding a lens wafer) as a final step. Final assembly of the lens wafer to the spectacles can, in fact, be divorced from the rest of the manufacturing sequence, and performed by optometrists, opticians, or optical laboratories at a later date.

Figure 3:
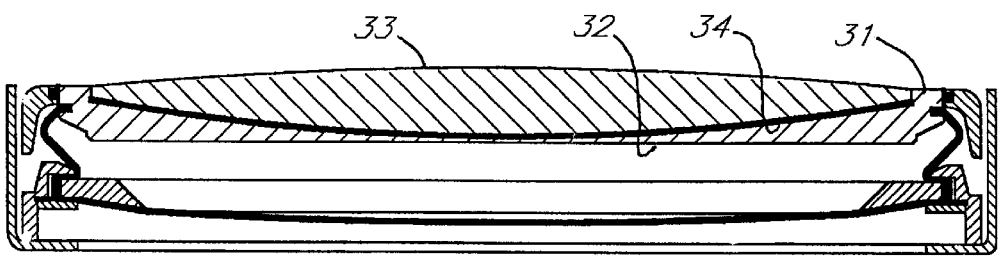
FIG. 3 is a cross sectional view of a second embodiment of a lens unit suitable for use in spectacles similar to those illustrated in FIG. 1, the view being similar to that shown in FIG. 2.

FIG. 3 illustrates a second embodiment of the invention, which is similar to the first embodiment, but which uses a rigid transparent wall as a lens interface (i.e., to retain the liquid in the capsule) rather than a membrane. FIG. 3 is a sectional view taken at the same place as FIG. 2, but showing the construction of the second embodiment. Instead of the interface between the lens wafer and the filling liquid being a thin membrane, the wafer support (31) is molded so as to provide an integral barrier for the liquid filling. If desired, the surface 32 may be molded flat, but the interface surface 34 between lens wafer 33 and wafer support 31 is preferably somewhat concave, as shown (exaggerated for clarity). The circumference of lens wafer 33 may be positioned in a recess in the wafer support 31 as shown in FIG. 3, or, alternatively, the interface surface 34 may intersect the back surface of the wafer support, as is convenient.

While the lens wafer and the wafer support could be assembled as described in connection with the first embodiment, it is preferred that they be attached by a layer of optical cement between the lens wafer and the wafer support. The procedure may start by placing a small quantity of a light-curing optical cement which has the appropriate index of refraction in the center of the dish-shaped recess formed in wafer support 31 and then dropping the lens wafer 33 into the recess in the wafer support. If the surfaces are clean, surface tension will cause the cement to flow outward until it covers the entire lens area, after which exposure to light (of the appropriate wavelength) will cure the cement. Instead of a light-curing cement, heat, chemical, or moisture curing cements could be used to accomplish the same result.

What has been invented is a construction for a liquid-filled variable focus lens which is amenable to mass production techniques, but yet is suitable for use in spectacles which must fit persons with differing eyesight characteristics. Various modifications and adaptations of the invention will no doubt occur to those skilled in the art. Such modifications and adaptations are intended to be within the terms and spirit of the following claims and hence are intended to be covered thereby.

We claim:

1. A liquid-filled variable focus lens unit which comprises:
    a liquid-filled variable focus capsule having a first set of predetermined optical characteristics and comprised of:
        i) a transparent wall member;
        ii) a transparent distensible membrane; and
        iii) a layer of transparent liquid filling the volume between said wall member and said distensible membrane; and
    a fixed-focus rigid lens exterior of and attached to said liquid-filled variable focus capsule and abutting said wall member, whereby said liquid-filled variable focus lens unit comprised of said liquid-filled variable focus capsule and said fixed-focus rigid lens possesses a second set of predetermined optical characteristics.

2. A liquid-filled variable focus lens unit as recited in claim 1 wherein the surface of said rigid lens which abuts said wall member has a convex shape.

3. A liquid-filled variable focus lens unit as recited in claim 2 wherein said rigid lens is attached to said lens capsule by a layer of transparent cement between said rigid lens and said wall member.

4. A liquid-filled variable focus lens unit as recited in claim 2 wherein the portion of said liquid-filled lens capsule which abuts said rigid lens is rigid.

5. A liquid-filled variable focus lens unit as recited in claim 1 wherein said transparent wall member is a thin flexible membrane.

6. A liquid-filled variable focus lens unit as recited in claim 1 wherein said rigid lens is adhesively attached to said lens capsule around the periphery of said rigid lens.

7. A liquid-filled variable focus lens unit as recited in claim 1 and further including a film of liquid between said fixed-focus rigid lens and said transparent wall member.

8. A liquid-filled variable focus lens unit which comprises:
- a closed chamber having opposed exterior walls, said opposed exterior walls of said chamber comprising a transparent wall member and a distensible membrane;
- a transparent liquid filling said chamber;
- means for varying the pressure of said transparent liquid in said chamber; and
- a fixed-focus rigid lens exterior of said chamber and abutting said transparent wall member.

9. A liquid-filled variable focus lens unit as recited in claim 8 wherein said means for varying the pressure of said transparent liquid comprises means for changing the spacing between said transparent wall member and said distensible membrane.

10. A liquid-filled variable focus lens unit as recited in claim 8 where the surface of said rigid lens which abuts said transparent wall member is convex, and further including a layer of transparent cement between said rigid lens and said transparent wall member.

11. A liquid-filled variable focus lens unit as recited in claim 8 and further including a film of liquid between said rigid lens and said transparent wall member.

12. A liquid-filled variable focus lens unit as recited in claim 8 wherein said transparent wall member is a thin flexible membrane.

13. A liquid-filled variable focus lens unit as recited in claim 8 wherein said transparent wall member is rigid.

14. A liquid-filled variable focus lens unit as recited in claim 13 wherein said transparent wall member has a concave shape.

* * * * *